(12) United States Patent
Li et al.

(10) Patent No.: US 11,995,065 B2
(45) Date of Patent: May 28, 2024

(54) DATABASE ANOMALY DETECTION

(71) Applicant: STRIPE, INC., South San Francisco, CA (US)

(72) Inventors: Xin Li, San Jose, CA (US); Hanhan Xiang, Bellevue, WA (US); Yue Zhang, Belmont, CA (US); Guanglei Song, Belmont, CA (US); Mu Lin, Palo Alto, CA (US); Jeffrey Reiter, Seattle, WA (US); Wei Keong Mah, Folsom, CA (US); Jay Chen, Fremont, CA (US)

(73) Assignee: STRIPE, INC., South San Francisco, CA (US)

( * ) Notice: Subject to any disclaimer, the term of this patent is extended or adjusted under 35 U.S.C. 154(b) by 96 days.

(21) Appl. No.: 17/566,014

(22) Filed: Dec. 30, 2021

(65) Prior Publication Data

US 2023/0214379 A1 Jul. 6, 2023

(51) Int. Cl.
*G06F 16/23* (2019.01)
(52) U.S. Cl.
CPC ...... *G06F 16/2365* (2019.01); *G06F 16/2379* (2019.01)
(58) Field of Classification Search
None
See application file for complete search history.

(56) References Cited

U.S. PATENT DOCUMENTS

| 11,561,960 B2 * | 1/2023 | Jacinto | G06F 16/285 |
| 2021/0035011 A1 * | 2/2021 | Arnold | G06N 20/00 |

OTHER PUBLICATIONS

Fikri, Noussair, et al., "An adaptive and real-time based architecture for financial data integration", Springer, Journal of Big Data, vol. 6, Issue 97 (2019), 25 pages. (Year: 2019).*
Amazon, "Using CloudWatch Anomaly Detection", Internet Archive's Wayback Machine, captured on Nov. 12, 2020, 3 pages. (Year: 2020).*
Oracle, "Oracle Financials Accounting Hub Implementation Guide, Release 12.2", Sep. 2015, 438 pages. (Year: 2015).*

* cited by examiner

*Primary Examiner* — Scott A. Waldron
(74) *Attorney, Agent, or Firm* — FOLEY & LARDNER LLP (57) ABSTRACT

In one aspect, a method of detecting database anomalies, includes reading historical data in a destination database at an end of a data pipeline, determining bounds including an upper bound and a lower bound based on the read historical data, reading current data for a first specified time period in the destination database, responsive to determining the upper or the lower bound is exceeded, determining database transactions that caused the exceeding, and transmitting alerts to owners of the database transactions.

18 Claims, 9 Drawing Sheets

DATABASE ANOMALY DETECTION

BACKGROUND

Pipelines for data flowing from a data source to a destination database can be long and complex. Operations may be performed on the data in the pipeline potentially incorrectly, thereby corrupting the data that ends up residing in the destination database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A pipeline for data flowing from data intake (e.g., at business platforms) to a destination database (e.g., accounting platform) is a complicated system contributed and managed by different engineering teams. Issues, such as system bugs or misoperations, in any of the composing systems can propagate defects all the way through the pipeline and ended up causing incorrect data to be entered into the destination database.

Accordingly, an anomaly detection system described herein 1) builds a pattern based on historic data (e.g., balances) in the destination database (e.g., general ledger account balances), 2) regularly (e.g. once a day) checks the updated data (e.g., balances) against the pattern, 3) raises alarms if the current data (e.g., balances) do not match the expected pattern, and 4) uncovers the transactions contributing to the anomaly.

Figure 1:
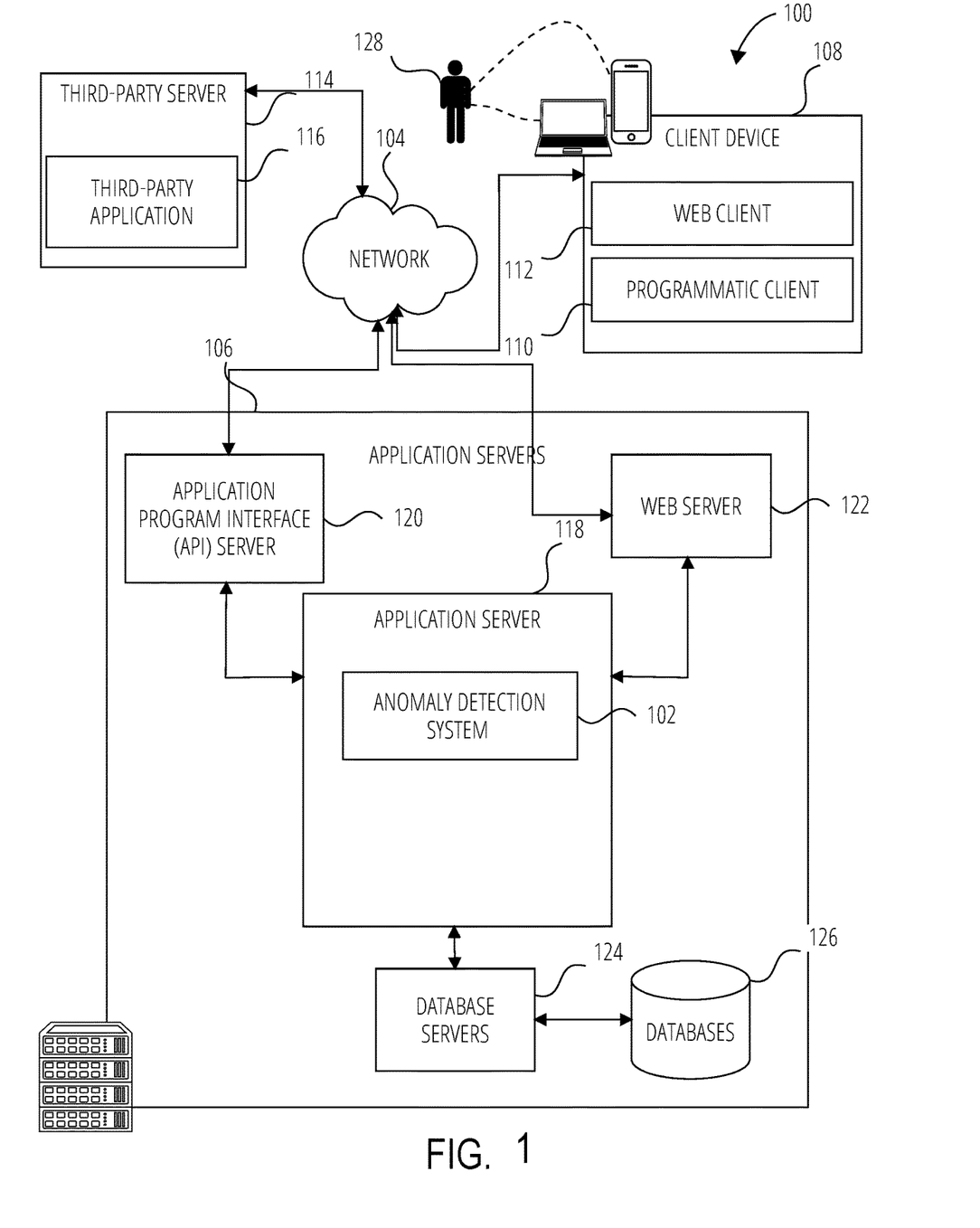
FIG. 1 is a diagrammatic representation of a networked environment in which the present disclosure may be deployed, in accordance with some example embodiments.

FIG. 1 is a diagrammatic representation of a networked computing environment 100 in which some example embodiments of the present disclosure may be implemented or deployed.

One or more application servers 106 provide server-side functionality via a network 104 to a networked user device, in the form of a client device 108 that is accessed by a user 128. A web client 112 (e.g., a browser) and a programmatic client 110 (e.g., an "app") are hosted and execute on the web client 112.

An Application Program Interface (API) server 120 and a web server 122 provide respective programmatic and web interfaces to application servers 106. A specific application server 118 hosts an Anomaly Detection System 102, which includes components, modules and/or applications.

The web client 112 communicates with the Anomaly Detection System 102 via the web interface supported by the web server 122. The Anomaly Detection System 102 will be discussed in further detail below. Similarly, the programmatic client 110 communicates with the Anomaly Detection System 102 via the programmatic interface provided by the Application Program Interface (API) server 120.

The application server 118 is shown to be communicatively coupled to database servers 124 that facilitates access to an information storage repository or databases 126. In an example embodiment, the databases 126 includes storage devices that store information to be published and/or processed by the Anomaly Detection System 102.

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may support one or more features or functions on a website hosted by the third party.

Figure 2:
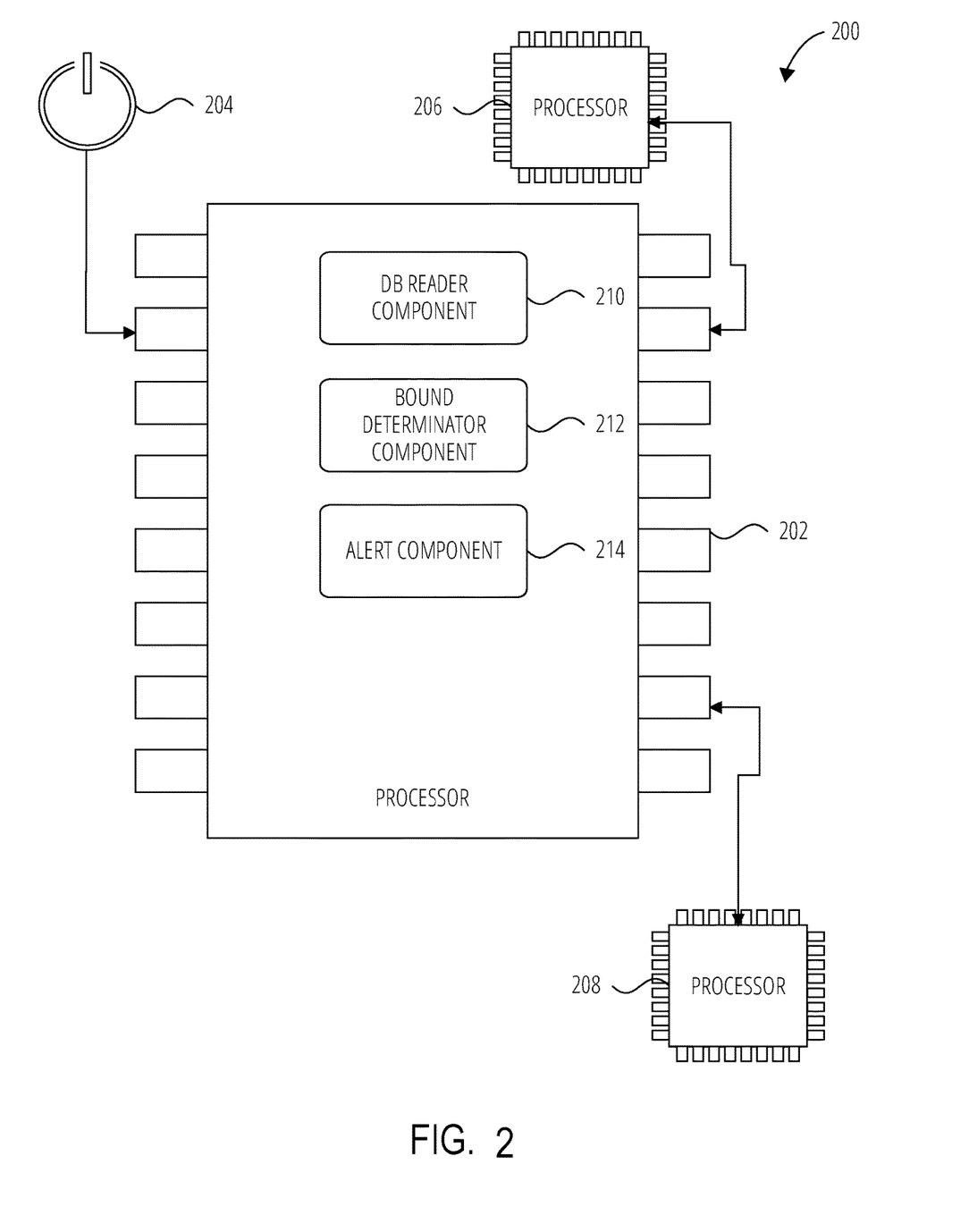
FIG. 2 is a diagrammatic representation of a processing environment, in accordance with some example embodiments.

Turning now to FIG. 2, a diagrammatic representation of an Anomaly Detection System 102 (also referred to as Anomaly Detection System 200) is shown, which includes the Processor 206, the Processor 208, and a Processor 202 (e.g., a GPU, CPU or combination thereof).

The Processor 202 is shown to be coupled to a power source 204, and to include (either permanently configured or temporarily instantiated) modules, namely a database (DB) reader component 210, a bound determinator component 212, and an alert component 214. The DB reader component 210 operationally reads data from a database, such as databases 126, the bound determinator component 212 operationally expected average upper and lower bounds for numerical data stored in the database based on historical data, and the alert component 214 operationally generates alerts when those determined bounds are exceeded.

Figure 3:
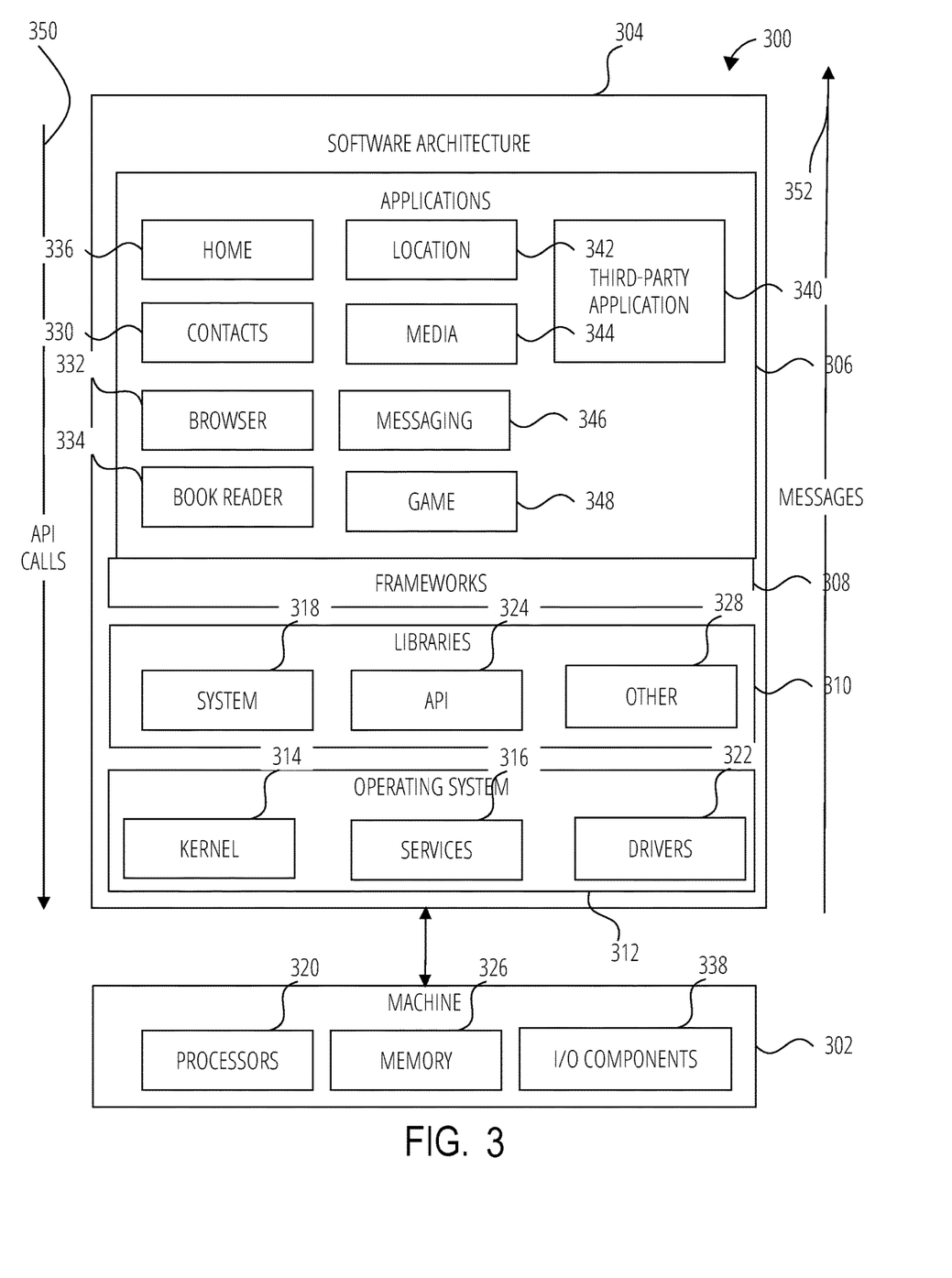
FIG. 3 is block diagram showing a software architecture within which the present disclosure may be implemented, in accordance with some example embodiments.

FIG. 3 is a block diagram 300 illustrating a software architecture 304, which can be installed on any one or more of the devices described herein. The software architecture 304 is supported by hardware such as a machine 302 that includes processors 320, memory 326, and I/O components 338. In this example, the software architecture 304 can be conceptualized as a stack of layers, where each layer provides a particular functionality. The software architecture 304 includes layers such as an operating system 312, libraries 310, frameworks 308, and applications 306. Operationally, the applications 306 invoke API calls 350 through the software stack and receive messages 352 in response to the API calls 350.

The operating system 312 manages hardware resources and provides common services. The operating system 312 includes, for example, a kernel 314, services 316, and drivers 322. The kernel 314 acts as an abstraction layer between the hardware and the other software layers. For example, the kernel 314 provides memory management, Processor management (e.g., scheduling), component management, networking, and security settings, among other functionality. The services 316 can provide other common services for the other software layers. The drivers 322 are responsible for controlling or interfacing with the underlying hardware. For instance, the drivers 322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 310 provide a low-level common infrastructure used by the applications 306. The libraries 310 can include system libraries 318 (e.g., C standard library) that provide functions such as memory allocation functions, string manipulation functions, mathematic functions, and the like. In addition, the libraries 310 can include API libraries 324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 310 can also include a wide variety of other libraries 328 to provide many other APIs to the applications 306.

The frameworks 308 provide a high-level common infrastructure that is used by the applications 306. For example, the frameworks 308 provide various graphical user interface (GUI) functions, high-level resource management, and high-level location services. The frameworks 308 can provide a broad spectrum of other APIs that can be used by the applications 306, some of which may be specific to a particular operating system or platform.

In an example embodiment, the applications 306 may include a home application 336, a contacts application 330, a browser application 332, a book reader application 334, a location application 342, a media application 344, a messaging application 346, a game application 348, and a broad assortment of other applications such as a third-party application 340. The e applications 306 are programs that execute functions defined in the programs. Various programming languages can be employed to create one or more of the applications 306, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 350 provided by the operating system 312 to facilitate functionality described herein.

Figure 4:
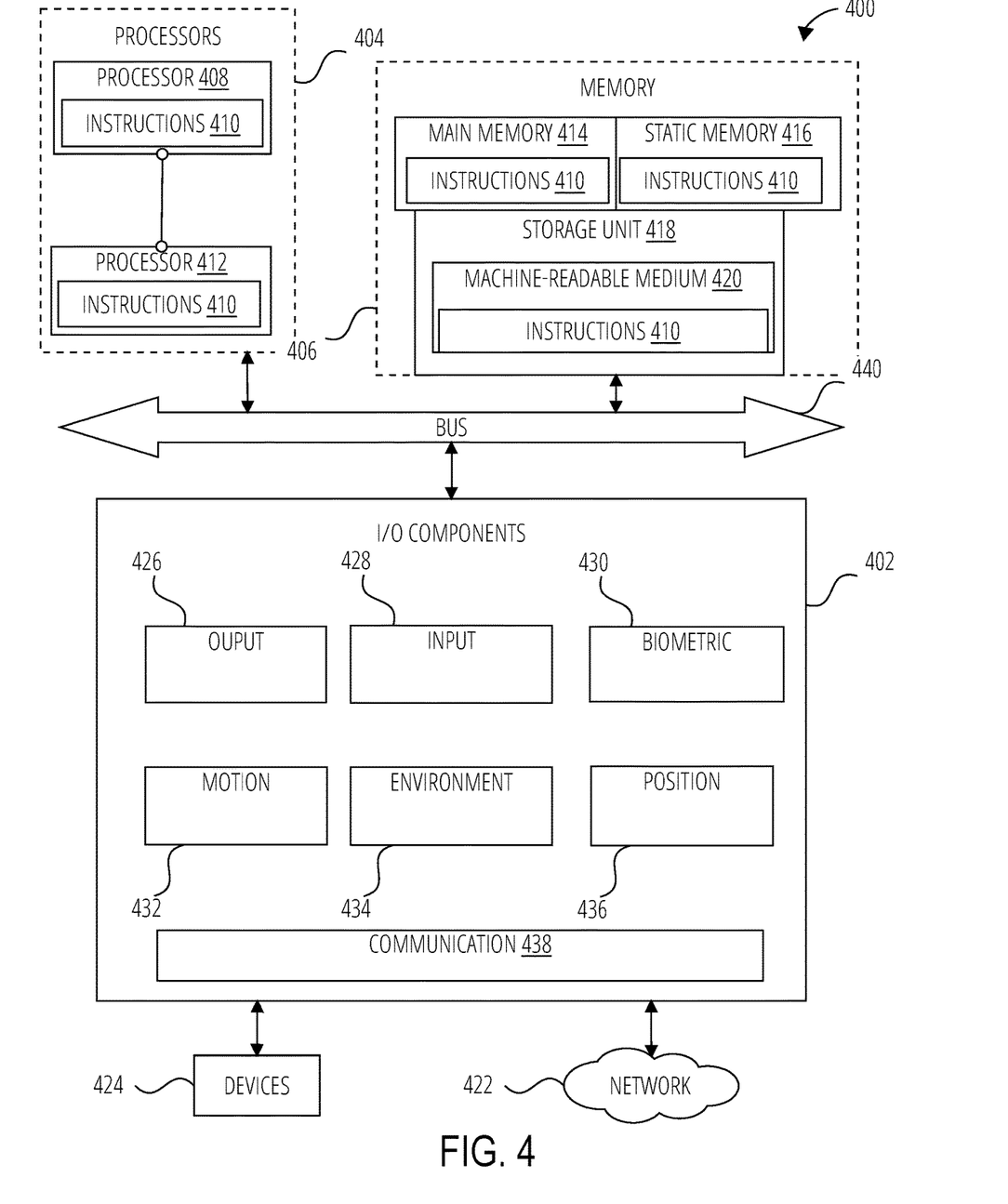
FIG. 4 is a diagrammatic representation of a machine in the form of a computer system within which a set of instructions may be executed for causing the machine to perform any one or more of the methodologies discussed herein, in accordance with some example embodiments.

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory 406, and I/O components 402, which may be configured to communicate with each other via a bus 440. In an example embodiment, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 408 and a Processor 412 that execute the instructions 410. The term "Processor" is intended to include multi-core processors that may comprise two or more independent processors (sometimes referred to as "cores") that may execute instructions contemporaneously. Although FIG. 4 shows multiple processors 404, the machine 400 may include a single Processor with a single core, a single Processor with multiple cores (e.g., a multi-core Processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various example embodiments, the I/O components 402 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope). The environmental components 434 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 436 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and/or memory of the processors 404) and/or storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed embodiments.

The instructions 410 may be transmitted or received over the network 422, using a transmission medium, via a network interface device (e.g., a network interface Component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Figure 5:
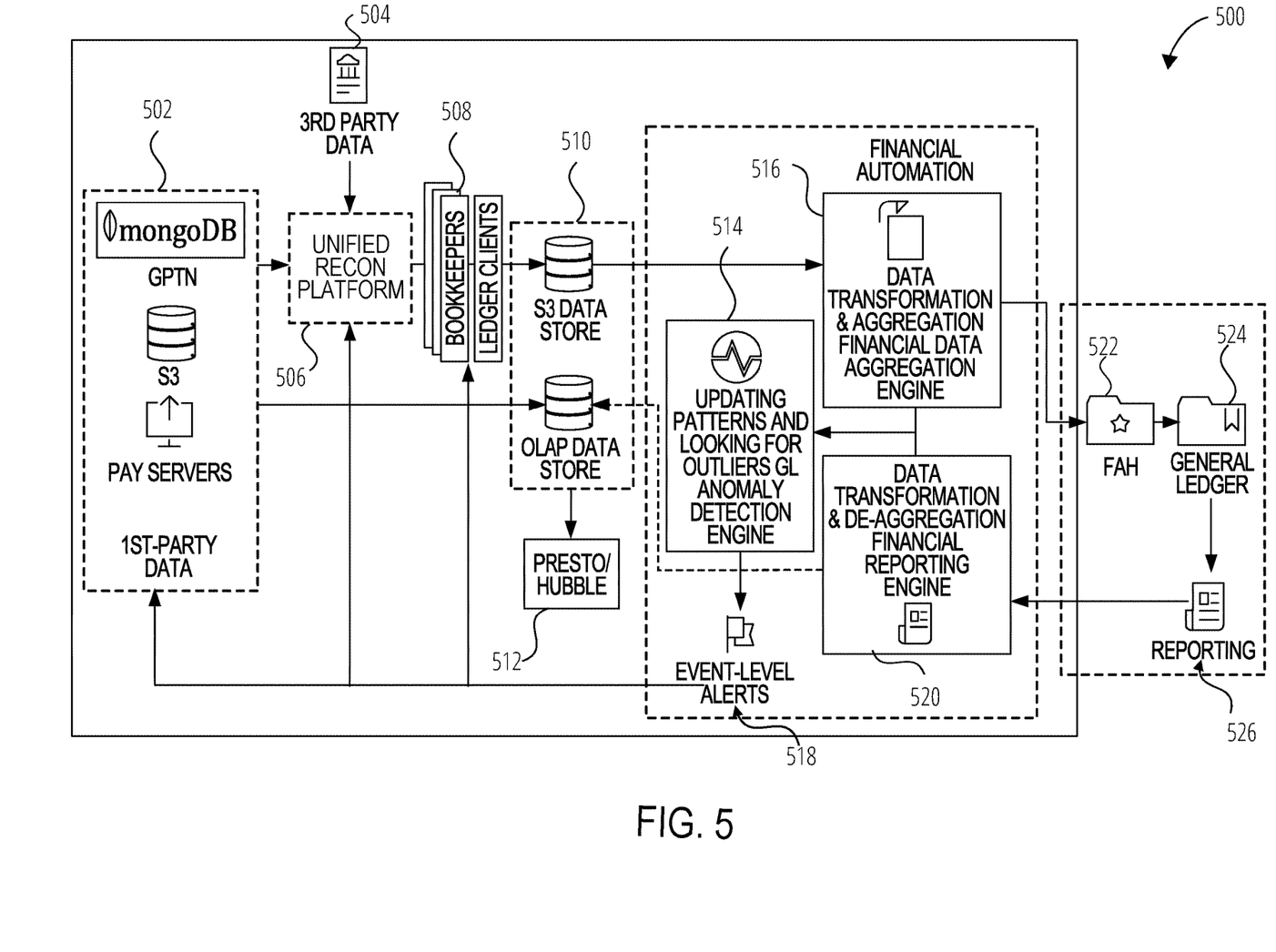
FIG. 5 illustrates a system in accordance with some example embodiments.

FIG. 5 illustrates a pipeline 500 in accordance with an example embodiment. A destination database 524 may be a General Ledger (GL), which is a bookkeeping system where all accounting data are posted from subledgers. The GL comprises accounts, defined by the Chart of Accounts (COA) and represented with account numbers, e.g. account 113000 is for bookkeeping generic account receivables. In the pipeline 500, transactions generated by business platforms are processed, transformed, aggregated, and ultimately posted to the GL by an accounting pipeline through which accounting-interested transactions continuously flow from the business platforms to the GL in real time. The GL also periodically generates reports which can be used for various business needs such as auditing, reporting, analytics, company financial statements, etc.

However, the pipeline for data flowing from business platforms to the GL is itself a complicated system contributed and managed by different engineering teams. Issues, such as system bugs or misoperations, in any of the composing systems can propagate defects all the way through the pipeline and ended up causing incorrect value in the destination database 524.

Accordingly, the Anomaly Detection System 102, which may be implemented as the Anomaly Detection System 200 and/or anomaly detector 514 1) builds a pattern based on a GL account historic balances, 2) regularly (e.g. once a day) checks the updated balances against the pattern, 3) raises alarms if the current balances do not match the expected pattern, and 4) uncovers the transactions contributing to the anomaly. The Anomaly Detection System 102 can be applied on different GL accounts for a complete coverage of detection.

The pipeline 500 comprises a data source, e.g., customer facing transactions 502, which is coupled to a reconciliation platform 506 that reconciles data from the customer facing transactions 502 with third party data 504 (e.g., bank data to verify banking data from a transaction). Note that customer facing transactions 502 can include providing access to networks and/or online databases (e.g., via access servers). After reconciliation, the reconciled data is processed by a bookkeeper 508 and stored in data warehouses 510. A user may query data in the data warehouses 510 using a query interface 512. Data from the data warehouses 510 is then aggregated by the aggregation engine 516, and then passed to a subledger 522 and finally the destination database 524, which can be a general ledger. Reporting 526, in conjunction with the financial reporting engine 520, can generate reports from the destination database 524 by pulling data from it.

The anomaly detector 514 pulls data from the destination database 524 using the financial reporting engine 520 to determine if there is an anomaly, as will be discussed further below. If there is an anomaly, the anomaly detector 514 can pull the relevant transactions and transmit an alert 518 to the relevant owner (e.g., generator or operator on/of the transaction) for review.

The anomaly detector 514 periodically, e.g. once every day, consumes two data sets: The current GL account balances from the financial reporting engine 520 are compared against existing normal ranges, as discussed further below. If the current account balances are normal values, i.e. within the range, they are also used to update the normal range values. On the other hand, if the new account balances are outside of the normal range, flags will be raised to draw team's attentions. The raw transactions from the aggregation engine 516 are pulled, when an anomaly is detected, in order to "reverse" the aggregation process such that the transactions (or events) contributed to the GL account values can be identified. With the transaction level details, the alerts can be routed to the right upstream systems/platforms so the owning teams can take appropriate actions for investigation or mitigation.

Figure 9A:
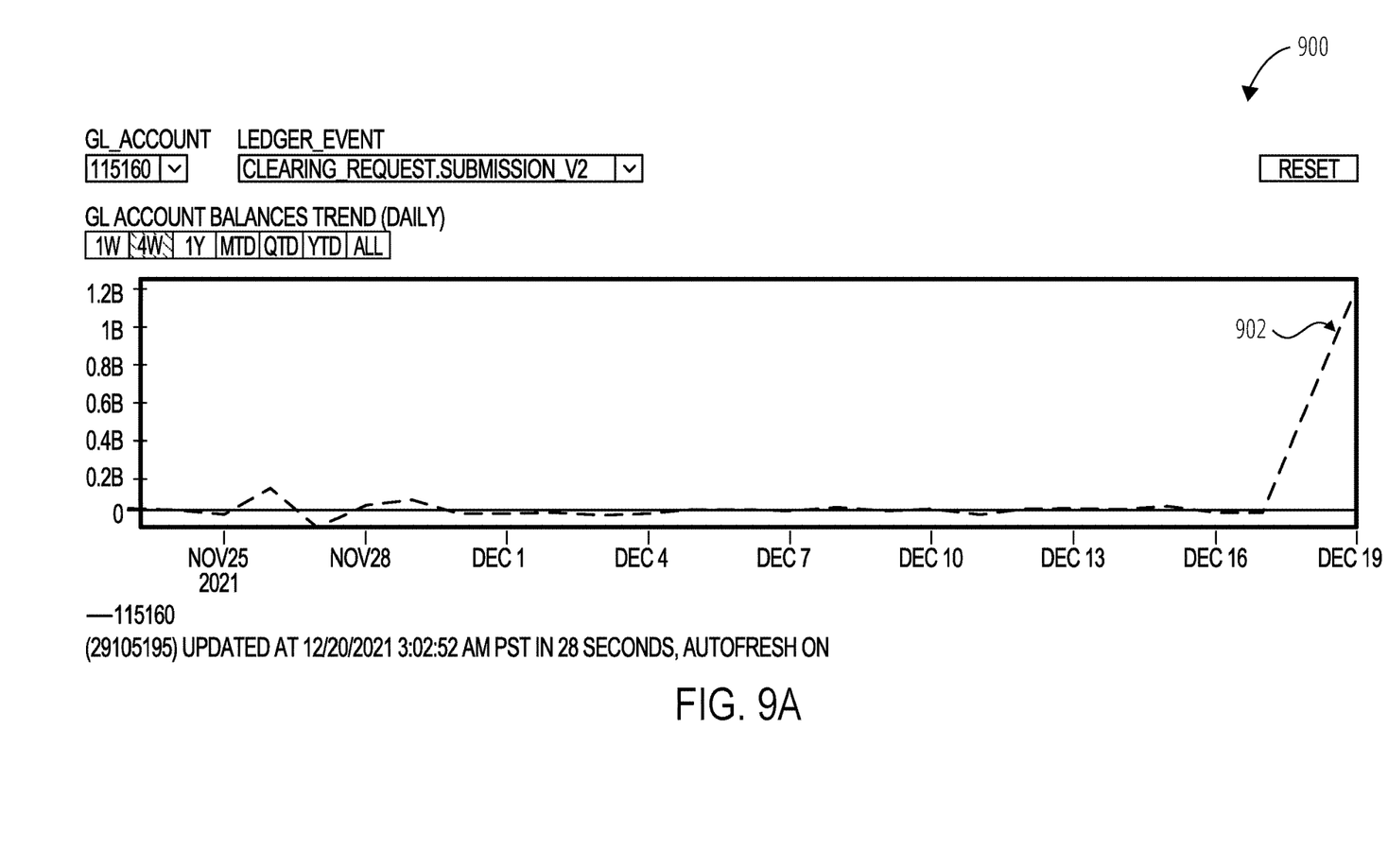
FIG. 9A and FIG. 9B illustrate a graphical user interface showing an anomaly in a data pipeline and cause of the same in accordance with some example embodiments.
Figure 9B:
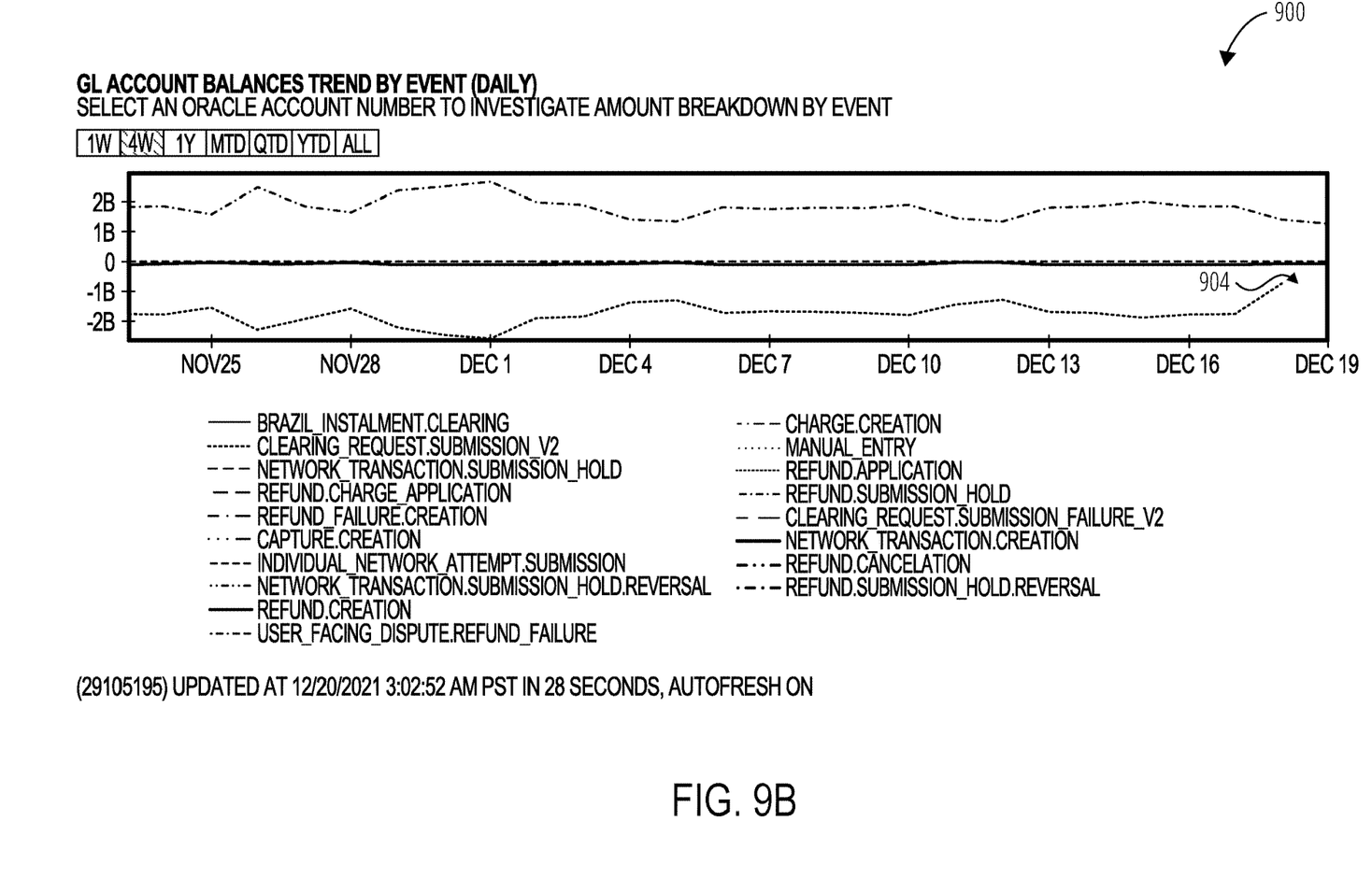

For example, in GUI 900 (FIGS. 9A and 9B), the top chart shows an anomaly 902, a $1.2B balance swing in recent days. The bottom chart shows that the reason was missing transactions 904 "clearing_request.submission_v2", which usually offsets the "charge.creation" transactions in order to zero the account balances. Accordingly the anomaly detector 513 provides a clearer picture of what is happening within the data pipeline 500.

Accordingly, the destination database 524 is no longer a passive data sink in the entire pipeline 500. It can work as a source for feedback to all the composing systems in the pipeline 500. By establishing the relationship between observed anomalous values in the destination database 524 and the responsible, individual transactions, the anomaly detector 514 potentially provides the following advantages: It maintains data integrity in the destination database 524 by quickly noting possible data corruption. It helps timely estimates of the potential risk/damages from the Company's business viewpoint. It can easily locate the ownership of the offending transactions so that appropriate actions can be taken to mitigate the anomalies. It can provide the engineering teams understanding of the business impact of the transactions generated by their systems/platforms and help the teams to actively prevent further anomalies from recurring. In addition, it may also facilitate the company's financial and accounting teams better understand the existing business and engineering logic through the end-to-end cycle.

Figure 6:
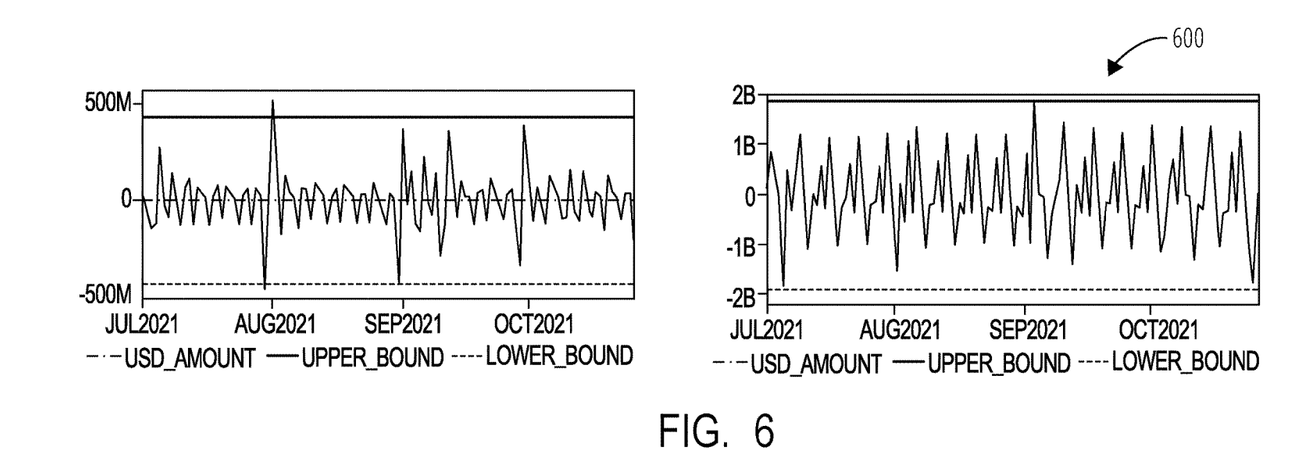
FIG. 6 illustrates an aspect of the subject matter in accordance with some example embodiments

FIG. 6 illustrates an aspect of the subject matter in accordance with one example embodiment. Each account in the destination database 524 represents a view of one aspect of a company's business operations. When looking at the historic daily balances of a few important accounts (as specified by accounting), there are conspicuous patterns— the balances in the accounts oscillate within a range of values, as shown in the following two graphs 600 for two different GL accounts balances since July 2021.

Accordingly, without relying on the real meaning of the business operation, the anomaly detector 514 can define a normal range within which each GL account balance bounces up and down over time as illustrated by the lower and upper bound in the plots above. A normal range may be defined as 3-5 standard deviations from mean values.

Figure 7:
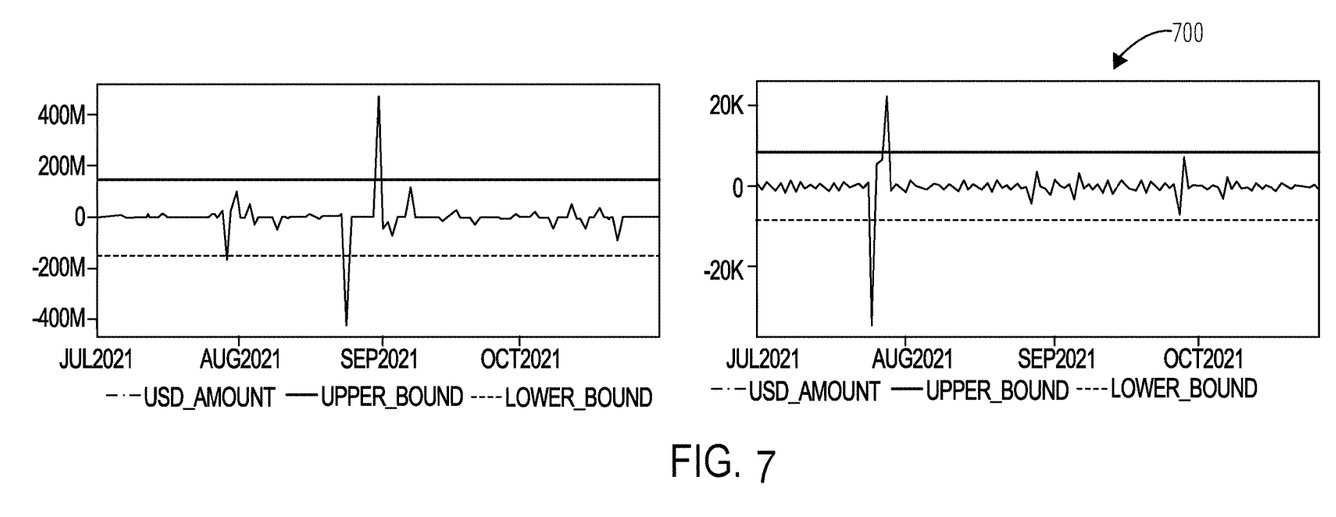
FIG. 7 illustrates an aspect of the subject matter in accordance with some example embodiments.

FIG. 7 illustrates an aspect of the subject matter in accordance with one example embodiment. When the balance of a destination database 524 account deviates significantly from the specified range, whether due to normal business operations or a real defect, it deserves attention and therefore can be considered as an anomaly calling for investigation by engineering and/or accounting teams. The graphs 700 show historic deviations of GL account balances from their normal ranges.

Figure 8:
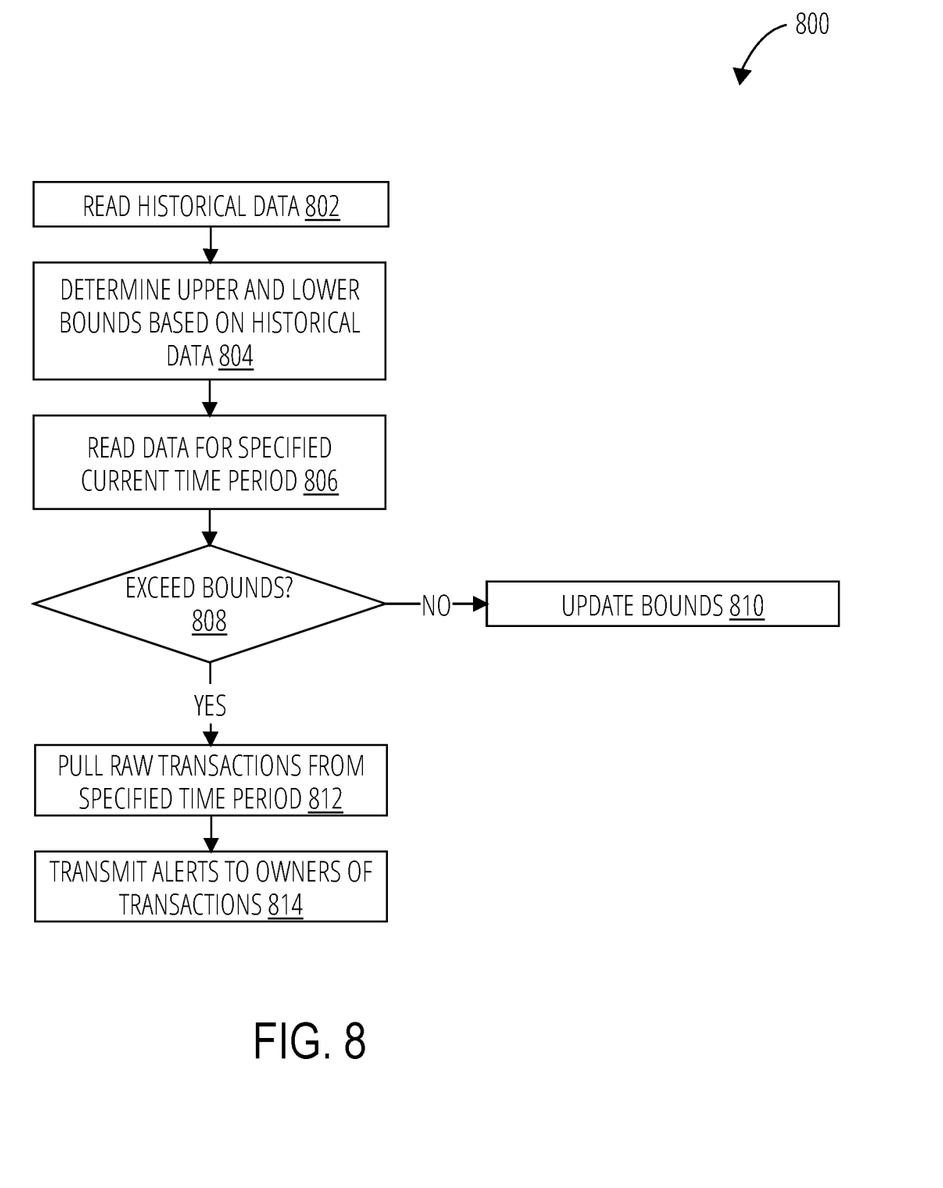
FIG. 8 illustrates a flowchart of method in accordance with some example embodiments.

FIG. 8 illustrates a flowchart of method 800 in accordance with an example embodiment. Example methods described herein may also be implemented in the form of executable instructions stored on a machine-readable medium or in the form of electronic circuitry. For instance, the operations of the method 800 may be represented by executable instructions that, when executed by a Processor of a computing device, cause the computing device to perform the method 800. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Initially, the DB reader component 210 reads (block 802) historical data in the destination database 524 at an end of the pipeline 500. The reading of values can be all historical data or for prespecified time period, e.g., 2 months. Next, the bound determinator component 212 determines (block 804) bounds including an upper bound and a lower bound based on the read historical data by calculating a mean for positive and negative values and using 3-5 standard deviations of the mean. Next, the DB reader component 210 reads (block 806) current data for a first specified time period in the destination database 524 (e.g., for a current day). Responsive to determining the upper or the lower bound is exceeded (decision block 808), the alert component 214 determines (block 812) database transactions that caused the exceeding, and transmits (block 814) alerts to owners of the database transactions. Responsive to determining that bounds are not exceeded (decision block 808), the determined bounds can be updated (block 810).

Accordingly, the Anomaly Detection System 102 maintains database integrity by detecting anomalies and notifying responsible components such that the detected anomalies may be corrected. My maintaining database integrity, online transactions that rely on database integrity (e.g., gaining access to a computer network) may continue smoothly without interruption.

The following examples describe various embodiments of methods, Computer-Readable Media, and systems (e.g., machines, devices, or other apparatus) discussed herein.

1. A method of detecting database anomalies, comprising:
reading, by one or more hardware processors, historical data in a destination database at an end of a data pipeline;
determining, by the one or more hardware processors, bounds including an upper bound and a lower bound based on the read historical data;
reading, by the one or more hardware processors, current data for a first specified time period in the destination database;
based on determining the upper or the lower bound is exceeded, determining, by the one or more hardware processors, database transactions that caused the exceeding; and
transmitting, by the one or more hardware processors, alerts to owners of the database transactions.

2. The method of example 1, further comprising based on determining that neither bound is exceeded, updating the determined bounds with the current data.

3. The method of any of the preceding examples, wherein the determining bounds comprises:
reading historical data over a second prespecified time period; determining an upper and a lower mean; and
setting the upper and lower bounds based on deviations of the upper and lower means, respectively.

4. The method of any of the preceding examples, wherein the database at the end of the data pipeline includes a general ledger.

5. The method of any of the preceding examples, wherein the data pipeline includes data generated by business platforms that processed, transformed, aggregated and posted to the general ledger.

6. The method of any of the preceding examples, wherein the first specified time period is a day.

7. The method of any of the preceding examples, wherein the pipeline includes a data source, a data warehouse and the destination database.

8. The method of any of the preceding examples, wherein the data source includes access servers.

9. The method of any of the preceding examples, wherein the access servers enable users to access networks.

10. A non-transitory computer-readable storage medium, the computer-readable storage medium including instructions that when executed by a computer, cause the computer to perform operations comprising:
reading historical data in a destination database at an end of a data pipeline;
determining bounds including an upper bound and a lower bound based on the read historical data;
reading current data for a first specified time period in the destination database;
based on determining the upper or the lower bound is exceeded, determining database transactions that caused the exceeding; and
transmitting alerts to owners of the database transactions.

11. A computing apparatus comprising:
at least one processor; and
at least one memory storing instructions that, when executed by the at least one processor, configure the computing apparatus to perform operations comprising:
reading historical data in a destination database at an end of a data pipeline;
determining bounds including an upper bound and a lower bound based on the read historical data;
reading current data for a first specified time period in the destination database; based on determining the upper or the lower bound is exceeded, determining database transactions that caused the exceeding; and
transmitting alerts to owners of the database transactions.

12. The computing apparatus of any of the preceding examples, wherein the instructions further configure the apparatus to update the determined bounds with the current data based on determining that neither bound is exceeded.

13. The computing apparatus of any of the preceding examples, wherein the determining bounds comprises read historical data over a second prespecified time period, determining an upper and a lower mean, and setting the upper and lower bounds based on deviations of the upper and lower means, respectively.

14. The computing apparatus of any of the preceding examples, wherein the database at the end of the data pipeline include a general ledger.

15. The computing apparatus of any of the preceding examples, wherein the data pipeline includes data generated by business platforms that processed, transformed, aggregated and posted to the general ledger.

16. The computing apparatus of any of the preceding examples, wherein the first specified time period is a day.

17. The computing apparatus of any of the preceding examples, wherein the pipeline includes a data source, a data warehouse and the destination database.

18. The computing apparatus of any of the preceding examples, wherein the data source includes access servers.

19. The computing apparatus of any of the preceding examples, wherein the access servers enable users to access a second database.

20. The computing apparatus of any of the preceding examples, wherein the access servers enable users to access to a network.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of detecting database anomalies, comprising:
   reading, by one or more hardware processors, historical data in a destination database at an end of a data pipeline, wherein the destination database is a general ledger, and the data pipeline includes data that is aggregated from one or more subledgers for posting to the general ledger;
   determining, by the one or more hardware processors, bounds including an upper bound and a lower bound based on the read historical data;
   reading, by the one or more hardware processors, current data for a first specified time period in the destination database;
   responsive to determining the upper or the lower bound is exceeded:
       pulling, by the one or more hardware processors, raw data in the data pipeline and disaggregating the raw data to identify whether any database transaction is an anomaly, wherein an anomaly is detected when corrupted data is transmitted through the data pipeline and stored within the destination database;
       transmitting, by the one or more hardware processors, an alert to at least one upstream database within the data pipeline in relation to the destination database where the upstream database is associated with a generation of at least one database transaction that has been identified as the anomaly; and
   responsive to determining the upper or the lower bound is not exceeded by numerical values in the current data:
       updating, by the one or more hardware processors, the upper bound or the lower bound based on the current data.

2. The method of claim 1, wherein the determining bounds comprises:
   reading historical data over a second prespecified time period;
   determining an upper and a lower mean; and
   setting the upper and lower bounds based on deviations of the upper and lower means, respectively.

3. The method of claim 1, wherein the data pipeline includes data generated by business platforms that processed, transformed, aggregated and posted to the general ledger.

4. The method of claim 1, wherein the first specified time period is a day.

5. The method of claim 1, wherein the data pipeline includes a data source, a data warehouse and the destination database.

6. The method of claim 5, wherein the data source includes access servers.

7. The method of claim 6, wherein the access servers enable users to access networks.

8. The method of claim 1, further comprising transmitting, by the one or more hardware processors, a second alert to an owner of a subledger in which the database transaction identified as an anomaly is posted.

9. A non-transitory computer-readable storage medium, the computer-readable storage medium including instructions that when executed by a computer, cause the computer to perform operations comprising:
   reading historical data in a destination database at an end of a data pipeline, wherein the destination database is a general ledger, and the data pipeline includes data that is from one or more subledgers for posting to the general ledger;
   determining bounds including an upper bound and a lower bound based on the read historical data;
   reading current data for a first specified time period in the destination database;
   responsive to determining the upper or the lower bound is exceeded:
       pulling raw data in the data pipeline and disaggregating the raw data to identify whether any database transaction is an anomaly, wherein an anomaly is detected when corrupted data is transmitted through the data pipeline and stored within the destination database;
       transmitting an alert to at least one upstream database within the data pipeline in relation to the destination database where the upstream database is associated with a generation of at least one database transaction that has been identified as the anomaly, and
   responsive to determining the upper or the lower bound is not exceeded by numerical values within the current data:
       updating, by the one or more hardware processors, the upper or the lower bound based on the current data.

10. A computing apparatus comprising:
    at least one processor; and
    at least one memory storing instructions that, when executed by the at least one processor, configure the computing apparatus to perform operations comprising:
    reading historical data in a destination database at an end of a data pipeline, wherein the destination database is a general ledger, and the data pipeline includes data that is from one or more subledgers for posting to the general ledger;
    determining bounds including an upper bound and a lower bound based on the read historical data;
    reading current data for a first specified time period in the destination database;
    responsive to determining the upper or the lower bound is exceeded:
        pulling raw data in the data pipeline and disaggregating the raw data to identify whether any database transaction is an anomaly, wherein an anomaly is detected when corrupted data is transmitted through the data pipeline and stored within the destination database;
        transmitting an alert to at least one upstream database within the data pipeline in relation to the destination database where the upstream database is associated with a generation of at least one database transaction that has been identified as the anomaly, and
    responsive to determining the upper or the lower bound is not exceeded by numerical values within the current data:
        updating, by the one or more hardware processors, the upper or the lower bound based on the current data.

11. The computing apparatus of claim 10, wherein the determining bounds comprises read historical data over a second prespecified time period, determining an upper and a lower mean, and setting the upper and lower bounds based on deviations of the upper and lower means, respectively.

12. The computing apparatus of claim 10, wherein the data pipeline includes data generated by business platforms that processed, transformed, aggregated and posted to the general ledger.

13. The computing apparatus of claim 10, wherein the first specified time period is a day.

14. The computing apparatus of claim 10, wherein the data pipeline includes a data source, a data warehouse and the destination database.

15. The computing apparatus of claim 14, wherein the data source includes access servers.

16. The computing apparatus of claim 15, wherein the access servers enable users to access a second database.

17. The computing apparatus of claim 15, wherein the access servers enable users to access to a network.

18. The computing apparatus of claim 10, wherein the operations further comprise transmitting a second alert to an owner of a subledger in which the database transaction identified as an anomaly is posted.

* * * * *